United States Patent Office 3,316,206
Patented Apr. 25, 1967

3,316,206
THERMO-STABILIZED COPOLYMERS OF TRI-
OXANE WITH UREA COMPOUNDS
Hans Dieter Hermann, Edgar Fischer, and Günther Roos, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 22, 1963, Ser. No. 274,813
Claims priority, application Germany, Apr. 28, 1962, F 36,666
3 Claims. (Cl. 260—45.8)

The present invention relates to a process for stabilizing copolymers of trioxane of high molecular weight by incorporating into the copolymers N-substituted urea derivatives.

Recently, thermally stable polyoxymethylenes of high molecular weight have gained considerable technical importance. They are excellently suitable for the manufacture of shaped articles by the injection molding or extrusion processes. The shaped articles are characterized especially by their hardness, strength and toughness. The two most important processes for the manufacture of polyoxymethylenes are the anionic polymerization of formaldehyde and the cationic polymerization of trioxane. The polyoxymethylene prepared in this manner carry hydroxy groups at the chain ends and have, thus, a semiacetal structure. Under the action of heat the semiacetals decompose with the formation of monomeric formaldehyde. According to a so-called zipper reaction, this decomposition can lead to the quantitive disintegration of the polymers into monomeric formaldehyde.

Polyoxymethylenes which are subjected to the action of heat should, therefore, be free from terminal semiacetal groups. Various methods are known for blocking the chain ends of the polymers, but all these methods are more or less complicated and expensive. The best known method is the acetylation of the terminal hydroxy groups with acetic anhydride. After the reaction the acetic anhydride in excess and the acetic acid formed must be carefully removed from the polymer. The polyoxymethylene acetate thus obtained has a satisfactory stability in the heat, but it is sensitive not only to the action of acids but also to the action of alkalies.

Methods for etherifying the terminal groups are complicated, partially they give poor yields and the products obtained have a low molecular weight.

It is much simpler to produce oxymethlene copolymers with stable terminal groups. By a suitable selection of the comonomers, copolymers can be obtained in which the disintegration starting at the chain ends comes to a standstill at the structural units of the comonomers. For preparing a stable copolymer it is thus only necessary to subject the copolymer to a thermal or alkaline aftertreatment. Especially favorable oxymethylene copolymers are those which contain in the chain oxalkyl groups having at least two adjacent carbon atoms. They can be prepared quite easily, for example, by copolymerizing trioxane with cyclic ethers or formals.

In practice, it is necessary to stabilize the oxymethylene copolymers as well as the homopolymers against thermal degradation and oxidation. It is surprising that the stabilizers used for stabilizing the homopolymers of trioxane cannot be used in the same manner for stabilizing the copolymers. In many cases the stabilizers for homopolymers show no or only a little effect on copolymers, more frequently, however, it is just the opposite. It is particularly remarkable that the stabilizer combinations used for stabilizing copolymers show strong synergistic effects. Therefore, it is important always to use harmonized stabilizer combinations, one component of which mainly protects the copolymer against thermal degradation and the other mainly against oxidation. Urea compounds are known as stabilizers for homopolymers of formaldehyde. However, in the stabilization of the homopolymers, polyamides and amides of polybasic carboxylic acids have a better effect for stabilizing oxymethylene copolymers, amidines have been proposed as stabilizers. In many cases, however, their effect is not sufficient and, moreover, they have the tendency to cause cross-linking of the polymer.

It has now been found that oxymethylene copolymers having oxalkylene groups with 2 or 4 adjacent carbon atoms in the main chain, which chain may carry as substituents lower alkyl groups, can be stabilized by N-substituted urea derivatives. There are preferably used urea derivatives carrying at least one substituent at the nitrogen atom, said substituent having an amino group and being selected from the group consisting of an aliphatic alkyl radical having 1 to 18 carbon atoms, a cycloaliphatic hydrocarbon radical having 5 to 6 carbon atoms, a mono- to binuclear aromatic hydrocarbon radical and a heterocyclic hydrocarbon radical. An especially good effect can be achieved when the aforesaid compounds are used in combination with phenols and/or aromatic amines already known as stabilizers for trioxane and the copolymers thereof. Urea derivatives as specified above, which, owing to their alkalinity, have no or only a poor stabilizing effect on poloxymethylene acetates, are distinctly superior to polyamides, amides of polybasic carboxylic acids and amidines when used as stabilizers for oxymethylene copolymers.

Suitable urea derivatives are, for example: N,N'-bis-(1-aminoethyl)-urea, 2-amino-4-ureido butyric acid ethyl ester, bis-(ureidomethyl)amine, tris-(ureidomethyl)amine, dipropylene-triamine-diurea, N-bis-(ureidoethyl)-2-nitriloethylamine, 2,4-bis-ureido-diphenylamine, N-bis-(ureidoethyl)-2-nitrilooctadecylamine 1,6-bis-(2-pyridylcarboxy-ureido)-hexamethylene.

An optimum stabilizing effect is obtained when the aforesaid urea derivatives are used together with phenols, (for example the phenols defined in U.S. Patent 2,871,-220) and/or aromatic amines (for example the amines defined in U.S. Patent 2,920,059), which have already been proposed for stabilizing homopolymers of trioxane. Suitable phenols are especially those which carry, as substituents in ortho and para position to the phenolic hydroxy group, aliphatic hydrocarbon radicals having 1–18 carbon atoms, for example, 2-methyl-4-tert. butyl 6-octadecyl phenol. Particularly suitable are bisphenols, for example 2,2-methyl-bis-(4-methyl-6-tert.butyl phenol) or condensation products from a phenol substituted in para position by a low molecular weight aliphatic hydrocarbon radical and formaldehyde, for example the condensation product from 4-tert.butyl phenol and formaldehyde.

Amines having a good stabilizing effect are, for example the derivatives of diphenyl amine, such as 4,4'-dioctyldiphenyl amine. Furthermore, there are well suitable aromatic amines carrying as substituents besides the amino-group, phenolic hydroxyl groups or amide groups or urea groups.

The above-mentioned stabilizer combinations confer upon the oxymethylene copolymers a thermal stability not previously reached at a processing temperature in the range of about 190 to 250° C. and an outstanding stability to oxygen. The combinations are very easy to use. In most cases it is sufficient to mechanically mix them with the copolymer. However, they can be applied to the polymer in any other manner.

The stabilizer concentration required for improving the thermal stability of high molecular weight oxymethylene copolymers depends on the activity of the urea compound, the phenol and/or aromatic amine used and, moreover, on the type and the quality of the copolymer to be stabilized. Thus the concentration can vary within wide limits. Each component of the stabilizer system can be used in a concentration in the range of from 0.01 to 10% by weight, calculated on the polymer, and preferably 0.05 to 5% by weight.

For testing the thermal stability of the oxymethylene copolymers, samples with and without stabilizers were heated for a definite period of time at a temperature above 200° C., for example for 30 minutes at 220° C. and the loss in weight was determined. The tests were carried out in an inert atmosphere, for example under nitrogen, and in air or oxygen. A satisfactory stabilizer system must give good values under the most different conditions.

By oxymethylene copolymers there are to be understood those which contain in the main chain oxalkyl groups having 2 to 4 adjacent carbon atoms in an amount of 0.1 to 50% by weight, calculated on the total copolymer. The copolymers need not contain stable terminal groups. Terminal semiacetal groups can be eliminated from the copolymer after the incorporation of the stabilizer system, for example by kneading the polymer at 180–220° C. under reduced pressure. In many cases it is more suitable, however, to stabilize copolymers having stable terminal groups. The stabilizers according to the invention can be used for stabilizing all copolymers having a reduced viscosity higher than 0.2, determined at 140° C. with a 0.5% solution of the polymer in butyrolactone in the presence of 2% of diphenylamine. Polymers having a reduced viscosity in the range of from 0.5 to 2 are preferably used. Although, on principle, all oxymethylene copolymers having a reduced viscosity within the specified limits can be stabilized, it is advantageous to use copolymers already having a certain minimum stability, for example copolymers which lose at most 80% of their weight when heated for 30 minutes at 220° C.

Oxymethylene copolymers of high molecular weight can be readily produced by cationic polymerization, preferably in the presence of boron tri-fluoride and the complex compounds thereof as catalysts. Comonomers which are especially suitable for the manufacture of the copolymers are cyclic alkylene oxides preferably having 2 to 4 carbon atoms and the derivatives thereof, oxetanes and cyclic formals of, for example, glycol, 1,3-butanediol and 1,4-butane-diol, diethylene glycol or 1,4-butenediol-(2). In some cases it may be advisable to incorporate further stabilizers into the copolymer, for example amides of polybasic carboxylic acids, polyamides or compounds of bivalent sulfur. In any case, it is favorable to use additionally a light stabilizer, for example an α-hydroxybenzophenone.

The stabilizer system can be incorporated into the polymer in any known manner. Particularly suitable are methods which allow of a uniform distribution of the finely divided stabilizers in the copolymer. For example, the finely ground stabilizers can be incorporated into the copolymer of high molecular weight in a dry mixer or on a roll mill. Alternatively, the stabilizers can be dissolved in a solvent, for example methanol and acetone, the polymer can be suspended in the solution obtained and the solvent can be evaporated until the mixture is dry. Sometimes, it may be especially favorable to incorporate the stabilizer system into the melt of the copolymer. In this case labile polymer constituents may be eliminated.

The high molecular weight oxymethylene copolymers which have been stabilized by the process of the present invention can be used, particularly when they contain stable terminal groups, for the manufacture of fibers, foils and films and, moreover, for making tubes, profiles and injection molded articles.

The following examples serve to illustrate the invention but they are not intended to limit it thereto, the percentages being by weight unless otherwise stated.

*Example 1*

A finely ground copolymer of trioxane and 4% by weight of diethylene glycol formal which was free from unstable portions was mechanically mixed with the compounds specified in Table 1. The stabilized samples were then heated for 45 minutes at 230° C. in air. The loss in weight of the samples is indicated in Table 1. The test results show that the compounds of the invention are superior to poly-N-vinyl-ethyl-acetamide and a known urea derivative.

TABLE 1

| Stabilizer 1 | Percent | Stabilizer 2 | Percent | Loss in weight of samples when heated for 45 minutes at 230° C. in air |
|---|---|---|---|---|
| 4,4′ dioctyldiphenylamine | 0.5 |  |  | 3.25 |
| Do | 0.5 | 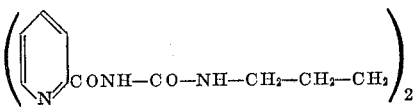 | 1 | 1.20 |
| Do | 0.5 | N-bis-ureido-ethyl-2-nitrilo-ethylamine | 1 | 1.07 |
| Do | 0.5 | Poly-N-vinyl-ethyl-acetamide | 1 | 2.28 |
| Do | 0.5 | Urea carboxylic acid ethyl ester | 1 | 2.48 |

*Example 2*

The stabilizers specified in Table 2 were dissolved in methanol. In the solutions there was suspended each time a high molecular weight copolymer of trioxane and 2% ethylene oxide having stable terminal groups. The solvent was then evaporated while stirring until the mixture was dry.

The stability of the samples was tested under the conditions set forth in the following Table 2. Table 2 likewise illustrates the superiority of the claimed stabilizer combinations over known compounds.

TABLE 2

| Stabilizer 1 | Percent | Stabilizer 2 | Percent | Percent loss in weight of sample after heating for— | | |
|---|---|---|---|---|---|---|
| | | | | 90'/220° C. under $N_2$ | 45'/230° C. under air | 45'/230° C. under $O_2$ |
| 2,2-methylene-bis (4-methyl-6-t. butylphenol) | | | | | | |
| Do | | | | 10.7 | 23.0 | 45.0 |
| Do | 1 | Dipropylenetriamine diurea | 1 | 6.1 | 2.2 | 8.1 |
| Do | 1 | N-bis-ureidoethyl-$-nitriloethylamine | 1 | 1.9 | 1.65 | 4.9 |
| | | | | 1.4 | 1.45 | 2.9 |
| Do | 1 | 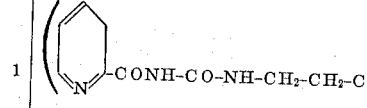 | 1 | 1.5 | 1.29 | 3.3 |
| Condensation product from p-isobornyl-phenol+$CH_2O$ | 1 | 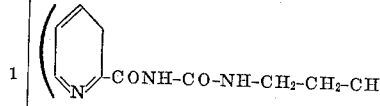 | | 3.5 | 2.1 | 11.2 |
| Do | 1 | Dipropylenetriamine diurea | 1 | 1.9 | 1.48 | 6.0 |
| Do | 1 | N-bis-ureidoethyl-2-nitriloethylamine | 1 | 1.3 | 1.13 | 2.3 |
| 2,2-methylene-bis (4-methyl-6-t.-butylphenol) | 1 | NN'-diphenyl urea | 1 | 3.5 | 2.07 | 6.5 |
| Do | 1 | Urea | 1 | 5.1 | 2.21 | 7.0 |
| Do | 1 | Malonic acid diamide | 1 | 4.1 | 2.13 | 8.2 |
| Do | 1 | Melamine | 1 | 3.1 | 1.85 | 6.5 |

Example 3

The compounds mentioned in Table 3 were mechanically incorporated into an acetylized homopolymer of trioxane and the loss in weight of the samples was determined after heating for 30 minutes at 220° C. under nitrogen. The table shows that the stabilizer combinations have a low synergistic effect on homopolymers of trioxane and that a compound claimed as stabilizer for trioxane copolymers has a poor stabilizing effect on trioxane homopolymers.

TABLE 3

| Stabilizer 1 | Percent | Stabilizer 2 | Percent | Percent loss weight of sample after heating for 30 min. at 220° C. under $N_2$ |
|---|---|---|---|---|
| Malonic acid diamide | 1 | | | 3.7 |
| Do | 1 | 2,2-methylene-bis-(4-methyl-6-t. butylphenol) | 0.5 | 3.8 |
| Methoxymethyl polycaprolactam | 1 | | | 3.2 |
| Urea carboxylic acid ethyl ester | 1 | | | 6.2 |
| N-bisureidoethyl-2-nitriloethylamine | 1 | | | 10.2 |
| Do | 1 | 2,2-methylene-bis-(4-methyl-6-t. butylphenol) | 0.5 | 8.2 |

Example 4

1% of 2,2-methylene-bis-(4-methyl-6-tert. butylphenol) was kneaded for 10 minutes at 200° C. into the melt of a copolymer of trioxane and 5% of dioxolane. When heated for 45 minutes at 230° C. in air a sample lost 2.20% of its weight. A further sample into which, besides the bisphenol, 1% of 2,4-bisureidodiphenylamine had been incorporated by kneading lost only 0.82% of its weight when heated in air for 45 minutes at 230° C.

We claim:

1. A copolymer whose repeating units consist essentially of —$OCH_2$— groups interspersed with 0.1 to 50% by weight of —$OCH_2CH_2$—$(R_3)_n$— groups in which $R_3$ is selected from the group consisting of methylene, lower alkyl-substituted methylene and lower alkyl-substituted oxymethylene radicals and $n$ is 0 to 2, said copolymer being in intimate admixture with from 0.01 to 10% by weight of N,N'-bis-(1-aminoethyl) - urea, 2 - amino-2-ureidobutyric acid ester, bis-(ureidomethyl)-amine, tris-(ureidomethyl) - amine, dipropylene-triamine-diurea, N-bis-(ureidoethyl)-2 - nitriloethylamine, 2,4-bis-ureidodiphenylamine, N-bis-(ureidoethyl) - 2 - nitrilo-octadecylamine or 1,6-bis-(2-pyridylcarbonylureido)-hexamethylene.

2. A copolymer of trioxane and diethylene glycol formal or ethylene oxide in intimate admixture with from 0.01 to 10% by weight of N,N' - bis-(1-aminoethyl)-urea, 2-amino-2-ureidobutyric acid ester, bis-(ureidomethyl)-amine, tris-(ureidomethyl)-amine, dipropylene-triamine-diurea, N-bis-(ureidomethyl)-2-nitriloethylamine, 2,4-bis-ureido-diphenylamine, N-bis - (ureidoethyl)-2-nitrilo-octadecylamine or 1,6-bis-(2-pyridylcarbonylureido)-hexamethylene.

3. A copolymer of trioxane and diethylene glycol formal or ethylene oxide in intimate admixture with from 0.01 to 10% by weight of N,N'-bis-(1-aminoethyl)-urea, 2-amino-2-ureidobutyric acid ester, bis-(ureidomethyl)-amine, tris-(ureidomethyl)-amine, dipropylene-triamine-diurea, N-bis-(ureidomethyl)-2-nitriloethylamine, 2,4-bis-ureido-diphenylamine, N-bis-(ureidoethyl)-2-nitrilo-octadecylamine or 1,6-bis-(2 - pyridylcarbonylureido)-hexamethylene and from 0.01 to 10% by weight of an additional stabilizer selected from the group consisting of 2,6-dimethyl-4-tert. butyl phenol, 2,2-methylene-bis-(4-methyl-6-tert. butyl phenol) and the condensation products of p-isobornyl phenol or 4-tert. butyl phenol and formaldehyde.

(References on following page)

References Cited by the Examiner

UNITED STATES PATENTS

| | | | |
|---|---|---|---|
| 2,683,172 | 7/1954 | Hill | 260—45.9 |
| 2,893,972 | 7/1959 | Kabico et al. | 260—45.9 |
| 3,103,499 | 9/1963 | Dolce et al. | 260—45.9 |
| 3,131,165 | 4/1964 | Hermann et al. | 260—45.9 |
| 3,156,669 | 11/1964 | Kray et al. | 260—45.9 |
| 3,166,530 | 1/1965 | Eguchi et al. | 260—45.9 |
| 3,201,367 | 8/1965 | Smith | 260—45.9 |
| 3,240,748 | 3/1966 | Schmidt et al. | 260—45.95 |

FOREIGN PATENTS 216,218  7/1961  Austria.

LEON J. BERCOVITZ, *Primary Examiner.*

H. E. TAYLOR, *Assistant Examiner.*